United States Patent [19]
Larsson

[11] Patent Number: 5,228,057
[45] Date of Patent: Jul. 13, 1993

[54] METHOD OF DETERMINING SAMPLING TIME POINTS

[75] Inventor: Lars G. Larsson, Bromma, Sweden

[73] Assignee: Telefonaktiebolaget L M Ericsson, Stockholm, Sweden

[21] Appl. No.: 978,167

[22] Filed: Nov. 17, 1992

Related U.S. Application Data

[63] Continuation of Ser. No. 613,065, Nov. 15, 1990, abandoned.

[30] Foreign Application Priority Data

Nov. 15, 1989 [SE] Sweden ................ 8903842

[51] Int. Cl.$^5$ ................................ H04L 27/10
[52] U.S. Cl. ...................... 375/14; 375/111; 375/114
[58] Field of Search ............ 375/13, 14, 94, 95, 375/96, 106, 111, 114, 116; 364/728.03; 307/518, 523; 371/5.4, 47.1

[56] References Cited

U.S. PATENT DOCUMENTS

| | | | |
|---|---|---|---|
| 4,365,329 | 12/1982 | Sauvanet | 370/100.1 |
| 4,379,284 | 4/1983 | Boykin | 340/310 R |
| 4,389,727 | 6/1983 | Rouffet | 364/178 |
| 4,599,732 | 7/1986 | LeFever | 375/13 |
| 4,653,076 | 3/1987 | Jerrim et al. | 375/1 |
| 4,768,208 | 8/1988 | Cornett | 375/95 |
| 4,823,382 | 4/1989 | Martinez | 379/411 |
| 5,012,491 | 4/1991 | Iwasaki | 375/114 |
| 5,029,186 | 7/1991 | Maseng et al. | 375/94 |

FOREIGN PATENT DOCUMENTS

2112236 7/1983 United Kingdom .

OTHER PUBLICATIONS

"Adaptive Adjustment of Receiver for Distorted Digital Signals", A. P. Clark and S. F. Hau, IEE Proceedings, vol. 131, Pt. F, No. 5, (Aug. 1984) pp. 526-536.
"Estimation of the Sampled Impulse-Response of a Channel"; A. P. Clark, C. P. Kwong, and F. McVerry, Signal Processing 2 (1980) pp. 39-53.

*Primary Examiner*—Benedict V. Safourek
*Attorney, Agent, or Firm*—Burns, Doane, Swecker & Mathis

[57] ABSTRACT

Symbol sequences having synchronization sequences are transmitted over a radio channel. Received signals are sampled in signal sampling time points (n) and by correlation a channel response ($C^2$) is obtained. The impulse response is sampled ($T_s$) over a period (M×N) corresponding to time dispersion of the channel. For separate samples with separate start points (n), channel estimates are obtained (n=0, 2, 4, 6, N=1, 3, 5, 7. . .) whose energy values are calculated, and the estimate (n=8, 10, 12, 14) with the largest energy is selected. The first time point (n=8) in this estimate is selected as sampling time point for the symbol sequence. Alternatively, the signal sampling time point (n=9) with maximum energy value ($C^2$ max) is selected. By comparing the energy values either one of these signal sampling time points (n=8, n=9) can be selected as the sampling time point for the symbol sequence. For consecutive sequences, an average value for the sampling time points is calculated.

10 Claims, 3 Drawing Sheets

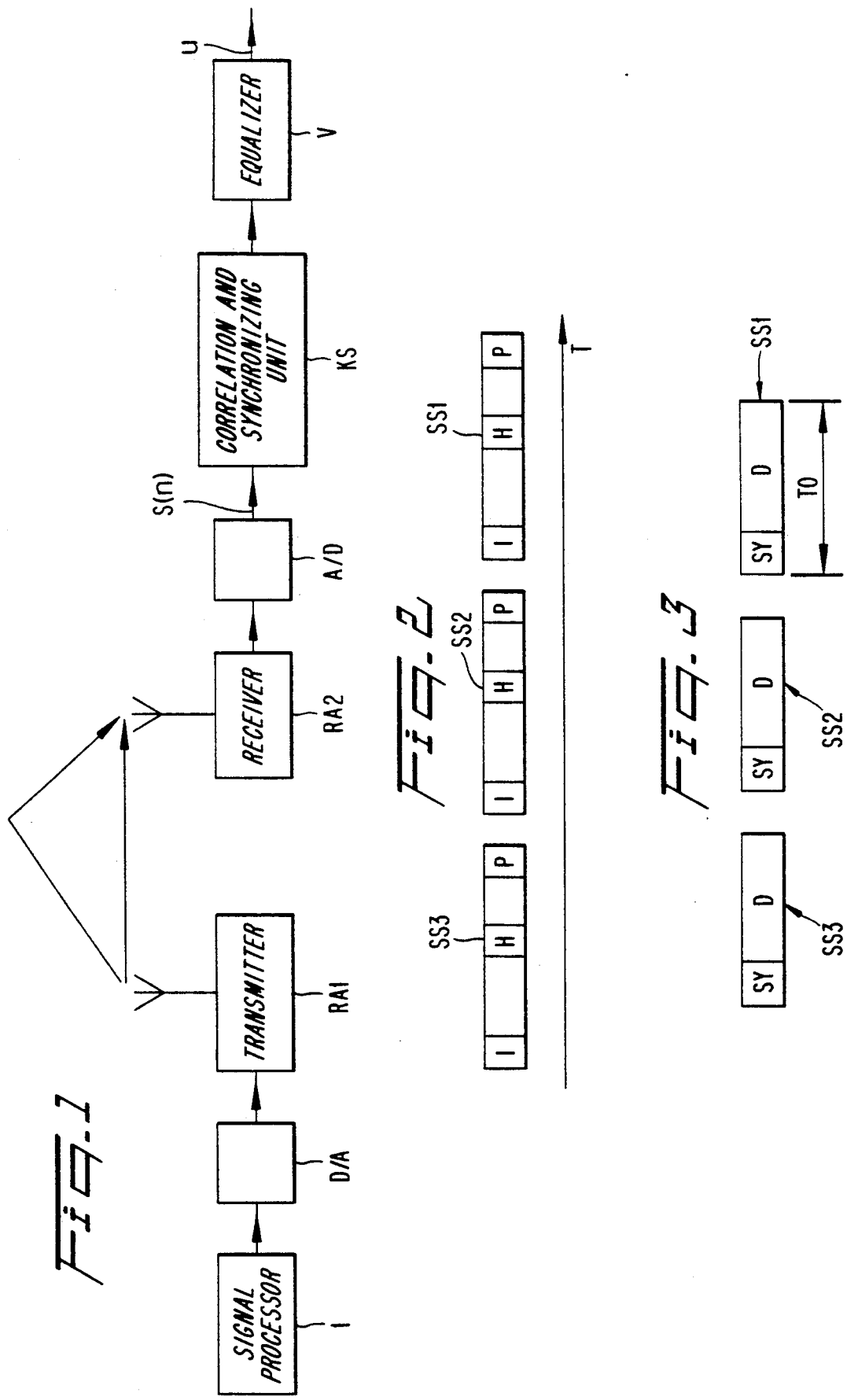

METHOD OF DETERMINING SAMPLING TIME POINTS

This application is a continuation of application Ser. No. 07/613,065, filed Nov. 15, 1990, now abandoned.

FIELD OF INVENTION

The present invention relates to a method of determining a sampling time point when transmitting symbol sequences with recurrent synchronization sequences, wherein the symbol sequences are transmitted as analog signals over a channel and are liable to be subjected to disturbances during said transmission, said method comprising the steps of:

sampling the received, analog signals at recurrent signal sampling time points which are selected in relation to a synchronization time point common to a transmitter and a receiver, wherein a time interval for transmission of a symbol, a symbol time, includes a whole number of signal sampling time points; and effecting channel correlation for calculating impulse response for the channel with the aid of the known synchronization sequences and the sampled, received signals.

BACKGROUND OF THE INVENTION

In the radio transmission of digital information, a number of problems occur which must be solved in order to enable the receiver to discern the information originally transmitted. One example of these problems resides in transmitter and receiver synchronization. This problem has found many solutions for different applications and is well known to the skilled person. Another problem is that the transmitted signals are liable to be affected by various kinds of disturbances, for instance noise, fading and multi-path propagation. The difficulties associated herewith have been tackled in several ways. Thus, it is well known to transmit a known synchronizing word and to calculate an impulse response for the transmission channel between transmitter and receiver with the aid of the known synchronizing word. The transmitted, unknown information can be interpreted by the receiver with the aid of the impulse response, and can be converted to an acoustic signal for instance, through a plurality of signal processing stages. A further example of the difficulties experienced with signal transition is one of controlling the receiver frequency in time with the transmitter frequency. This difficulty has been recognized and a number of well-known methods are found for controlling the frequency of the receiver. One problem, on the other hand, which would not appear to have awakened any particular interest is that of optimally utilizing the signal strength of the transmitted signal during the aforesaid transmission of digital information. It should be observed in this respect that in the case of multipath propagation a transmitted signal can be refound at several mutually different receiver time points. Despite research, both in the patent literature and in other sources, no publication has been found which deals with this problem.

SUMMARY OF THE INVENTION

The present invention is based on the concept of optimally utilizing the signal strength of a transmitted signal for the purpose of simplifying the signal processing necessary in a receiver. This optimization is achieved by selecting a time point for sampling the transmitted symbols. This choice is based on a comparison of the energy content of different parts of the channel impulse response.

The invention has the characterizing features set forth in the accompanying claims.

BRIEF DESCRIPTION OF THE DRAWINGS

An exemplifying embodiment of the invention will now be described with reference to the accompany drawings, in which FIG. 1 is a block schematic illustrating a part of a mobile telephony system;

FIG. 2 illustrates time slots for time-shared transmission of information;

FIG. 3 illustrates symbol sequences transmitted in a time-shared time slot;

DESCRIPTION OF THE PREFERRED EMBODIMENTS

Figure 7:
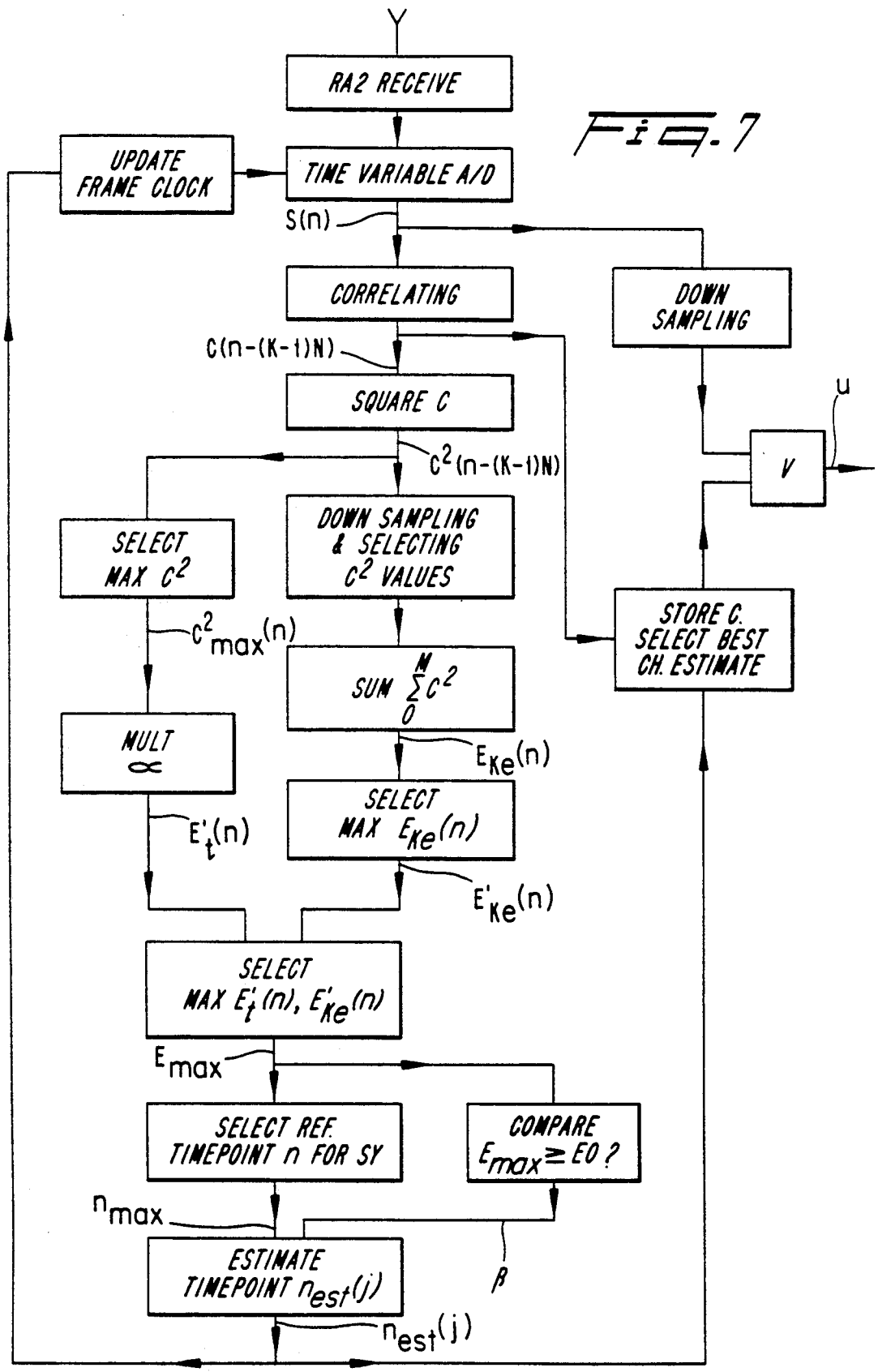
FIG. 7 is a flow chart of an exemplary embodiment of the method according to the present invention.

FIG. 1 schematically illustrates a radio transmission system. FIG. 7 represents a flow diagram of the method described herein. Signal processing, for instance channel coding, of the information to be transmitted is effected in a unit 1 and the information is sent to a digital-/analog converter D/A in the form of digital signals. The converter sends analog signals to a transmitting radio unit RA1, which transmits the signals over a channel to a receiving radio unit RA2. This unit sends the received signals to an analog/digital converter A/D, in which sampling of the signal takes place at a relatively high rate. Sampling takes place at regular intervals at signal sampling time points, the number of which is generally referenced n, so as to obtain a sampled signal S(n). That part of the radio transmission system described hitherto is well known to the person skilled in this art. Synchronization, channel correlation and down sampling of the signal S(n) takes place in a correlation-and-synchronization circuit KS, as described in more detail hereinafter. The actual method in which a reference sampling time point is selected during the down sampling operation is the object of the present invention. The the down sampled signals are sent from the circuit KS for further signal processing, in the case of the illustrated embodiment to an equalizer V, which produces estimated symbols U. The inventive method of selecting sampling time points provides improved signal processing in the equalizer V.

Figure 4:
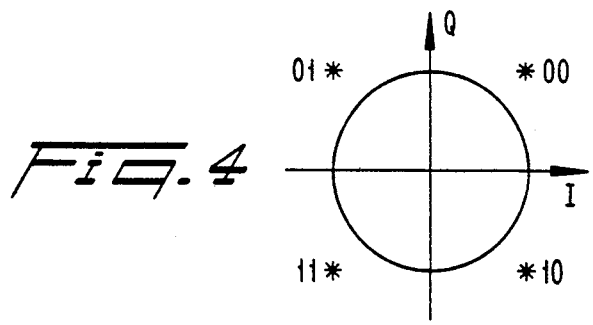
FIG. 4 illustrates a complex number plan with symbol values.

The aforedescribed radio transmission system may, for instance, form a part of a time-shared mobile telephony system. Subscribers in this system are regularly assigned recurring time slots 1,——, P as illustrated in FIG. 2, in which T signifies time. One of the subscribers has been assigned the time slot numbered H and the symbol sequences designated SS1, SS2, SS3,—, are transmitted in this time slot. Each symbol sequence includes a synchronization sequence SY and a data sequence D and together take up the length of a time slot designated TO in FIG. 3. The transmitted signals may be modulated in accordance with QPSK-modulation, as illustrated in FIG. 4, for instance. In a complex number plan, with the axes designated I and Q, the four possible values of the symbols are marked one in each square with the binary digits 00, 01, 10 and 11. In the case of the aforesaid QPSK-modulation, the time taken to transmit a symbol, a symbol time Ts, is equal to the time for two binary digits.

Figure 5:
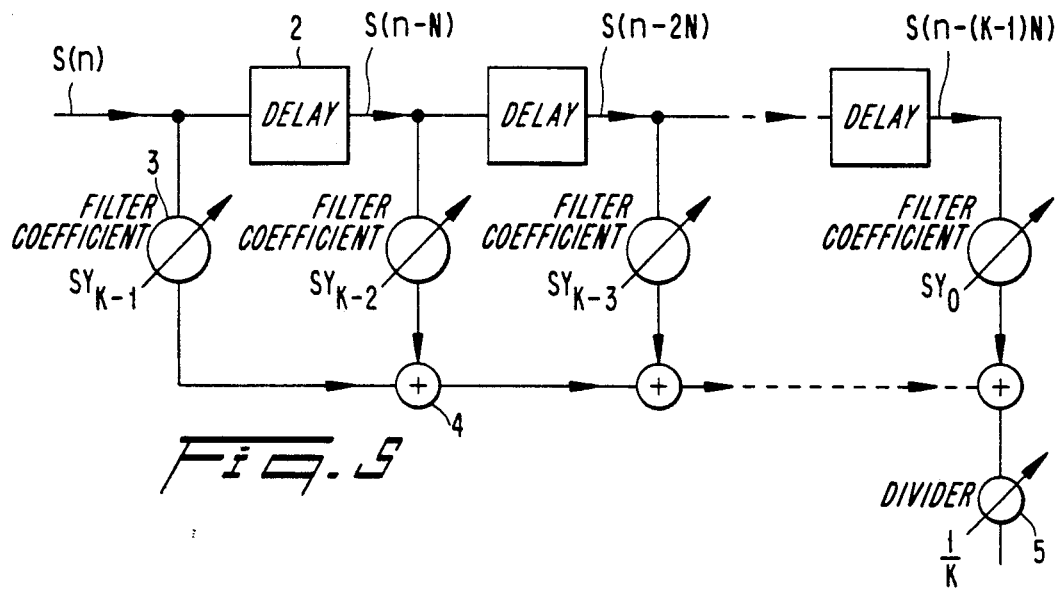
FIG. 5 is a block schematic illustrating a channel estimation filter.

Various kinds of disturbances are liable to occur during transmission of the symbols over the channel, for instance such disturbances as multipath propagation, as indicated with double signal paths in FIG. 1. These disturbances change from one signal sequence to the immediately following sequence. In order to enable interpretation of the transmitted information contained in the data sequence D, a sampled impulse response of the channel is determined in a known manner for each signal sequence. This is achieved by correlating the known synchronization sequence SY in the receiver with the received, sampled values S(n) in the synchronization sequence. Correlation is carried out in a filter, as illustrated in FIG. 5. The filter has delay units 2, filter coefficients 3 and summators 4. The filter coefficients have the values $SY_0$-$SY_{K-1}$ corresponding to the known synchronization word, the length of which is a number K symbol sampling intervals. The received, sampled synchronization word S(n) is delayed in the delay unit 2, so as to subsequently obtain signals S(n−N)-S(n−(K−1)N) which are stepwise delayed by one symbol sampling interval. The delayed signals are multiplied with their respective coefficients and summators in the summator 4. Subsequent to dividing the summated values with the number K in a circuit 5, values C(n−(K−1)N) in the sampled impulse response for the radio units RA1 and RA2 are obtained successively. These values are squared in a circuit 5a to discrete energy values $C^2(n-(K-1)N)$.

Figure 6:
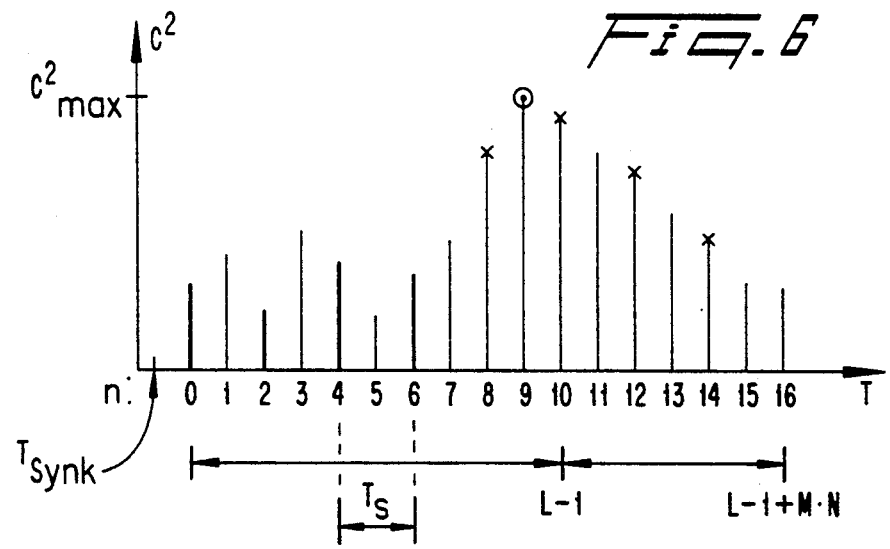
FIG. 6 is a diagram with an impulse response for the transmission channel.

FIG. 6 illustrates the energy of the sampled impulse response obtained in the aforedescribed manner for the synchronization sequence in the symbol sequence SS1. As in FIG. 2, T designates the time and $C^2$ generally designates the energy for the discrete correlation values $C^2(n-(K-1)N)$ of the impulse response, these values being marked with columns at the signal sampling time points n. The impulse response has a length of $L+M\times N$ sample, which have been numbered from 0 to $L-1+M\times N$ in the Figure. In the illustrated case, N designates the number of signal sampling time points n for each symbol and according to the illustrative example in FIG. 4 N is equal to 2. The length of a channel estimate for the equalizer V in symbol times Ts is designated M, and in the case of the illustrative example, M is equal to 3. The length $M\times Ts$ of the channel estimate is determined by the magnitude of the time dispersion possessed by the channel, so that the equalizer V will be able to equalize dispersions which range up to $M\times Ts$. The letter L designates the number of signal sampling time points over which the correlation must be carried out in order to ensure that the impulse response will cover a large and rapid change in the transmission properties of the channel. Normally, an interval which covers L samples is called a correlation window. According to the sample illustrated in FIG. 6, L=11 and the signal sampling time points n of the impulse response have been numbered from 0 to 16.

As mentioned in the introduction, down sampling of the signal S(n) takes place in the correlation-and-synchronization circuit KS. This down sampling takes place in step with the symbol timing at symbol sampling time points having an interval of one symbol time Ts between two mutually adjacent samples. The energy values of the impulse response of FIG. 6 are also down sampled in step with the symbol timing to energy values of channel estimates, the length of which is selected to M symbol times Ts in accordance with the aforegoing. It is possible, in accordance with the invention, to select a plurality of different channel estimate energy values from the impulse response in FIG. 6, this selection being effected in the following manner: A first down sampling of the impulse response energy values commences at the signal sampling time point n=0. Sampling continues in the symbol sampling time points at each alternate sampling time point n=2, n=4 up to n=6, where according to the illustrated embodiment N=2 and M=3. These channel estimate energy values are marked in FIG. 6 with heavily drawn columns. There is obtained in this way energy values for a first channel estimate of length $M\times Ts$, the total energy $E_{ke}(n)$ of which can be expressed generally by the relationship $$E_{ke}(n) = \sum_{i=0}^{M} C^2(n + N \times i)$$

which, with n=0, constitutes a comparison value for the energy of the first channel estimate. The next down sampling of the impulse response energy values commences at n=1 giving a comparison value $E_{ke}(1)$ and new values of the energy $E_{ke}(n)$ are subsequently calculated up to n=L−1, in the case of the illustrated embodiment n=10. There is obtained in this way an L number of comparison values $E_{ke}(n)$ of which one has a largest magnitude and is designated $E'_{ke}(n)$. Those symbol sampling time points of the impulse response energy values which give a channel estimate with this maximum energy have been marked with a cross in FIG. 6. The channel estimate having the comparison value $E'_{ke}(n)$ is selected and the first sampling time point in the selected channel estimate is selected as the reference sampling time point for the actual symbol sequence. In the case of the illustrated embodiment of FIG. 6, the sampling time point n=8 is selected, which according to the aforegoing applies for the symbol sequence SS1.

According to the invention, the reference sampling time point can also be calculated in the following alternative manner. That signal sampling time point of the signal sampling time points n in which the impulse response has maximum energy amplitude $C^2_{max}(n)$ is sought and constitutes the selected reference sampling time point. The comparison value in this reference sampling time point can be expressed with the simple relationship $$E'_r(n) = a \times C^2_{max}(n)$$

where a is a constant. $C^2_{max}(n)$ is marked with a ring in the FIG. 6 example and the corresponding sampling time point is n=9. This alternative method of selecting the reference sampling time point is beneficial when the impulse response has a single correlation value $C^2(n)$ which dominates over the remaining correlation values.

A combination of the two aforedescribed methods of selecting reference sampling time points also lies within the purview. The comparison value $E'_{ke}(n)$ and the comparison value $E'_r(n)$ are calculated in accordance with the aforegoing. The largest of these values $E_{max}$ is selected and the corresponding signal sampling time point $n_{max}$ constitutes the selected reference sampling time point.

The aforedescribed inventive method of selecting a reference sampling time point for one of the signal sequences according to the example SS1 has the advantage of simplifying the following signal processing step in, for instance, the equalizer V. It is possible, however, that the transmitted signal of the FIG. 1 illustration has been subjected to fading, i.e. the signal strength has fallen radically over a short time interval due to signal interference. If the fading occurs during the synchronization sequence SY, the selected channel estimate and the selected sampling time point will not be representative of the remainder of the symbol sequence. This weakness is particularly noticeable in transmission systems which have long symbol sequences extending over several milliseconds. This weakness is counteracted in accordance with the present invention by calculating an estimated value $n_{est}(j)$ for the sampling time point iteratively. The maximum energy value, for instance $E_{max}$, and the corresponding sampling time point $n_{max}$ is subsequently calculated for the sequences SS1, SS2, SS3—. The estimated sampling time point for the symbol sequence numbered j is calculated in accordance with the relationship $$n_{est}(j) = n_{est}(j-1) + \beta(n_{max} - n_{est}(j-1))$$

In this case, $n_{est}(j-1)$ is the estimated sampling time point from the preceding symbol sequence; $n_{max}$ belongs to the symbol sequence numbered j and $\beta$ is a weighting function. This weighting function may, for instance, assume the value $\beta = \beta 0$ when $E_{max}$ exceeds or is equal to a threshold value EO, while in other cases $\beta$ is equal to 0. Other average value formations can also be made. In general, the estimated sampling time point $n_{est}(j)$ will lie between two signal sampling time points n and the signal sampling time point which lies nearest $n_{est}(j)$ is selected as the sampling time point.

It should be noted that all time points of the receiver, for instance the signal sampling time points, are calculated in relation to a synchronization time point $T_{sync}$ of a frame clock, which is controlled in a known manner.

The invention has been described in the aforegoing with reference to an exemplifying embodiment applied with time-shared mobile telephony. It will be understood, however, that the invention can also be applied with other signal transmission systems as soon as recurrent synchronization sequences are transmitted. The intervals between the synchronization sequences may have varying lengths.

I claim:

1. A signal processing method comprising the steps of:
   sampling an analog signal at recurrent signal sampling time points which are selected relative to a synchronization time point common to a transmitter and a receiver, such that a time interval for transmission of a symbol comprises a whole number of signal sampling time points;
   correlating known synchronization sequences with sampled values generated by said sampling step to generate correlation values;
   determining energy values related to said correlation values;
   down sampling said energy values at a desired number of the signal sampling points which are mutually spaced apart by the time interval;
   calculating at least one comparison value based on said down sampled energy values and corresponding to at least one sampling signal time point;
   selecting one of the at least one comparison values having a largest magnitude;
   selecting one of the signal sampling time points which correspond to the selected largest comparison value as a reference sampling time point for one of said known synchronization sequences; and
   using said reference sampling time point to further process said analog signal.

2. The method of claim 1 wherein said step of using said reference sampling time point further comprises the step of:
   equalizing said analog signal using said reference sampling time point.

3. The method of claim 1 wherein said step of calculating further comprises the step of:
   summing energy values that are time indexed beginning at a predetermined symbol sampling time point, ending at a second predetermined symbol sampling time point and separated by said time interval.

4. The method of claim 3 further comprising the steps of:
   selecting the reference sampling time point for each subsequently received synchronization sequence; and
   iteratively averaging the reference sampling time points to obtain an estimated reference sampling time point.

5. The method of claim 4 wherein said step of iteratively averaging further includes the step of:
   applying a weighting function to the latest selected reference sampling time point corresponding to the latest incoming synchronization sequence, said weighting function assuming a zero value when the selected comparison value is beneath a predetermined threshold value.

6. A signal processing method comprising the steps of:
   sampling an analog signal at recurrent signal sampling time points which are selected relative to a synchronization time point common to a transmitter and a receiver, such that a time interval for transmission of a symbol comprises a whole number of signal sampling time points;
   correlating known synchronization sequences with sampled values generated by said sampling step to generate correlation values;
   determining energy values related to said correlation values;
   selecting an energy value having a largest magnitude;
   multiplying said energy value having the largest magnitude by a predetermined constant to determine a first comparison value;
   down sampling said energy values at a desired number of the signal sampling points that are mutually spaced apart by the time interval;
   calculating at least one second comparison value based on said down sampled energy values and corresponding to at least one sampling signal time point;
   selecting one of the at least one second comparison values having a largest magnitude;
   comparing said first comparison value with said selected at least one second comparison value;

selecting a signal sampling time point, which corresponds to one of the first comparison value and the selected at least one second comparison value, based on said comparing step as a reference sampling time point for one of said known synchronization sequences; and using said reference sampling time point to further process said analog signal.

7. The method of claim 6 wherein said step of using said reference sampling time point further comprises the step of:

equalizing said analog signal using said reference sampling time point.

8. The method of claim 6 wherein said step of calculating further comprises the step of:

summing energy values that are time indexed beginning at a predetermined symbol sampling time point, ending at a second predetermined symbol sampling time point and separated by said time interval.

9. The method of claim 8 further comprising the steps of:

selecting the reference sampling time point for each subsequently received synchronization sequence; and iteratively averaging the reference sampling time points to obtain an estimated reference sampling time point.

10. The method of claim 9 wherein said step of iteratively averaging further includes the step of:

applying a weighting function to the latest selected reference sampling time point corresponding to the latest incoming synchronization sequence, said weighting function assuming a zero value when the selected comparison value is beneath a predetermined threshold value.

* * * * *